H. LAUBERSHEIMER.
SPRING WHEEL.
APPLICATION FILED NOV. 1, 1910.
1,003,619.
Patented Sept. 19, 1911.
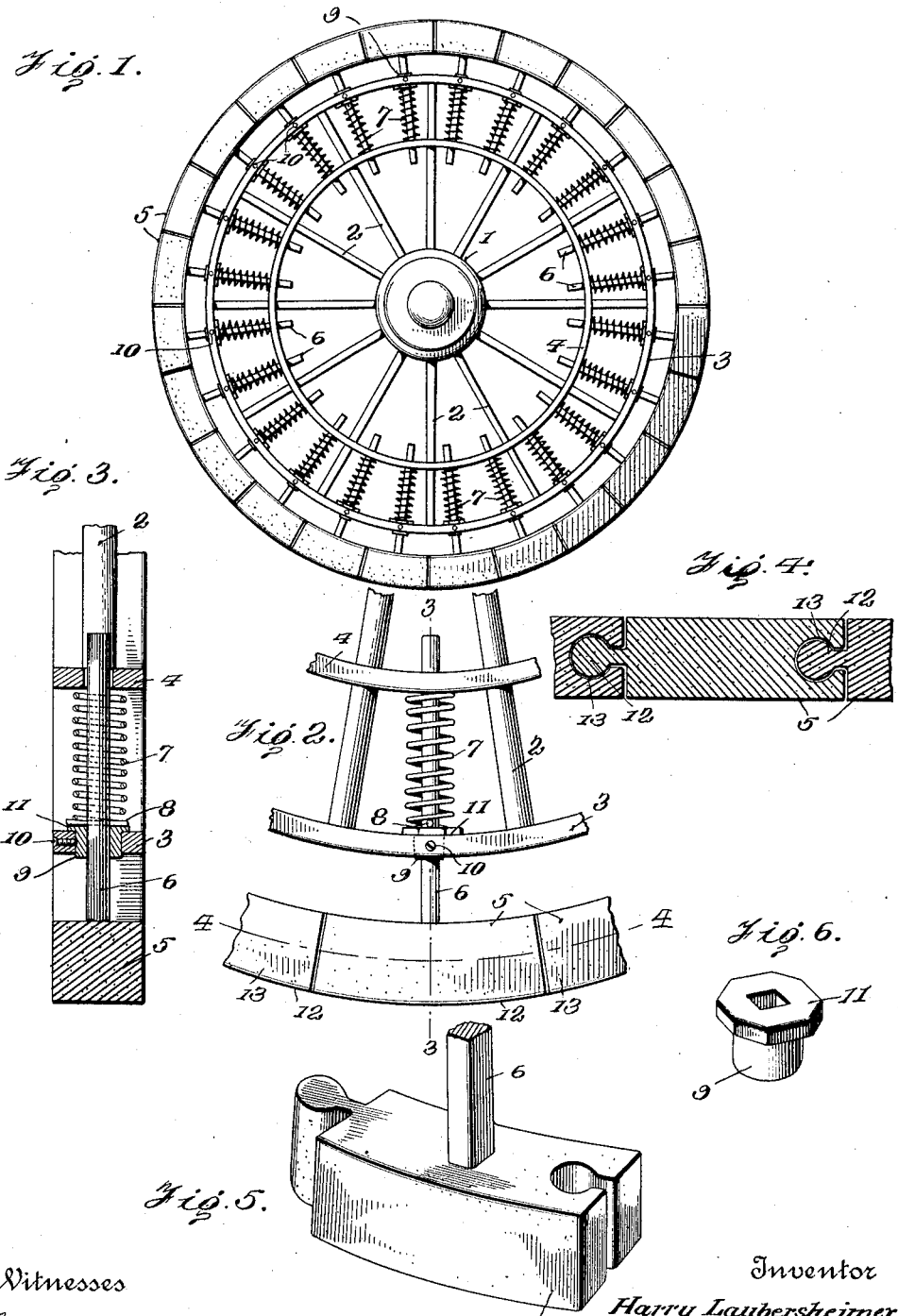
Witnesses
Inventor
Harry Laubersheimer
Attorney

UNITED STATES PATENT OFFICE.

HARRY LAUBERSHEIMER, OF NEW YORK, N. Y.

SPRING-WHEEL.

1,003,619.   Specification of Letters Patent.   Patented Sept. 19, 1911.

Application filed November 1, 1910.   Serial No. 590,127.

*To all whom it may concern:*

Be it known that I, HARRY LAUBERSHEIMER, a citizen of the United States, residing at New York, in the county of New York and State of New York, have invented certain new and useful Improvements in Spring-Wheels, of which the following is a specification.

The present invention relates to certain new and useful improvements in spring wheels, and has for its primary object to provide a wheel of this character formed with a flexible tread which is peculiarly designed so that it can be entirely constructed of metal, and which embodies novel features of construction whereby it will act in an effective manner to absorb all shocks and jars and prevent the same from being transmitted to the vehicle.

A further object of the invention is the provision of a spring wheel which is comparatively simple and inexpensive in its construction, which can be easily and quickly repaired in the event of an accident, and which will successfully withstand the severe wear and tear to which such devices are necessarily subjected when in operation.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawings, in which:—

Figure 1 is a side elevation of a spring wheel constructed in accordance with the invention. Fig. 2 is an enlarged side elevation of a portion of the periphery of the wheel. Fig. 3 is a sectional view on the line 3—3 of Fig. 2. Fig. 4 is a similar view on the line 4—4 of Fig. 2. Fig. 5 is a detail view of one of the tread sections, and Fig. 6 is a similar view of one of the bushings.

Corresponding and like parts are referred to in the following description and indicated in all the views of the drawings by the same reference characters.

Specifically describing the present embodiment of the invention, the numeral 1 designates a hub which may be of any conventional construction and from which a series of spokes 2 radiate. The outer rim 3 is secured to the extremities of the spokes 2, while the inner rim 4 is secured to the said spokes at an intermediate point in their length, the said rims being concentric with each other. The tread of the wheel is formed of a series of separable sections 5, the ends of which abut against each other and have a detachable and interlocking connection. Projecting from the central portion of each of the tread sections 5 is a stem 6 which passes slidably through both the outer rim 3 and the inner rim 4 and is radially disposed with respect to the wheel. A coil spring 7 surrounds each of the stems 6 between the two concentric rims 3 and 4 and is interposed between the inner rim 4 and a transverse pin 8 which is removably inserted within an opening in the stem. These coil springs 8 normally force the tread sections 5 away from the outer rim 3 and hold them yieldingly in a spaced relation thereto. However, when pressure is applied to the tread sections, they are forced inwardly and the springs 7 compressed, the said springs thereby serving to absorb the shocks and jars and prevent them from being transmitted to the vehicle.

For the purpose of preventing rotation of the tread sections 5 about the stems 6 as an axis, the said stems preferably have an angular or square formation and slide through bushings 9 which are rotatably mounted within openings in the outer rim 3. Set screws 10 normally hold the said bushings against rotation, and the said bushings are shown as provided with angular flanges 11 which fit against the inner faces of the outer rim 3 and are designed to be engaged by a wrench or similar implement should the bushings become stuck within the opening and resist turning after the set screw 10 has been loosened.

The ends of the tread sections 5 abut loosely against each other and have an interlocking connection which prevents the tread sections from pulling apart, but permits the various tread sections to move radially independently of each other. Each of the said tread sections is provided at one end thereof with an extension 12 and at the opposite end thereof with a recess 13 designed to receive the corresponding extension upon the adjacent tread section. In the present instance, the extension is formed with an enlarged and substantially circular head, and the recess is undercut so as to receive the enlarged head at the end of the extension 12 of the adjacent tread section to hold the tread section against pulling apart. Both the extension 12 and the recess 13 extend entirely from the top to the bottom of the tread section and are uniform in cross section throughout their length so that the extension upon each tread section will slide freely in a radial direction within the recess of the adjacent tread section. In this manner, the various tread sections are held securely together and caused to form a continuous tread around the wheel, but each of the tread sections is adapted to move inwardly when turned into contact with the surface of the road so as to bring the spring 7 into operation and cause the said spring to act as a buffer and absorb any shocks and jars which would otherwise be transmitted to the vehicle. By merely removing the pin 8, any one of the tread sections can be withdrawn from the wheel for the purpose of making any necessary repairs or replacing the same with a new tread section.

In the operation of the wheel, the springs 7 will permit the portion of the tread of the wheel in contact with the road to yield inwardly and will act as cushions to absorb the sudden shocks and jars and prevent the same from being transmitted through the wheel to the vehicle. In this manner the vehicle will be permitted to travel with the same ease and freedom from jolts and jars as were pneumatic tires provided.

Having thus described the invention, what I claim as new and desire to secure by Letters Patent, is:—

1. A spring wheel including a yieldable tread constructed of separable sections, each of the said sections being formed at one end thereof with an undercut recess and at the opposite end thereof with an extension terminating in an enlarged head, the extension of each of the sections fitting within the recess of an adjacent section, and both the extension and the recess extending entirely from the top to the bottom of the tread section and having a uniform cross section so that the extension will slide within the recess in a radial direction with respect to the wheel.

2. The combination of a wheel formed with a rim, a yieldable tread constructed of separable sections each of which is formed with a stem mounted to slide radially through the rim of the wheel, and yielding means engaging the stems, the said tread sections being formed at the abutting ends thereof with extensions and corresponding recesses for producing an interlocking connection, the said extensions and recesses extending entirely from the top to the bottom of the tread sections and being uniform in cross section throughout their length to admit of the extensions sliding freely within the recesses in a radial direction with respect to the wheel.

In testimony whereof I affix my signature in presence of two witnesses.

HARRY LAUBERSHEIMER.

Witnesses:
WILLIAM KLOETZER,
WILLIAM G. UNDERWOOD.

---

Copies of this patent may be obtained for five cents each, by addressing the "Commissioner of Patents, Washington, D. C."